(12) United States Patent
Shaikh et al.

(10) Patent No.: US 12,651,126 B2
(45) Date of Patent: Jun. 9, 2026

(54) INTENT DISCOVERY USING NATURAL LANGUAGE INFERENCE

(71) Applicant: Ally Financial Inc., Detroit, MI (US)

(72) Inventors: Samira Shaikh, Charlotte, NC (US); Zhuo Cheng, Charlotte, NC (US); Daniel Stephen Lieb, Charlotte, NC (US); Kimberly Weller, Canton, CT (US)

(73) Assignee: Ally Financial Inc., Detroit, MI (US)

( * ) Notice: Subject to any disclaimer, the term of this patent is extended or adjusted under 35 U.S.C. 154(b) by 312 days.

(21) Appl. No.: 18/120,142

(22) Filed: Mar. 10, 2023

(65) Prior Publication Data

US 2024/0303439 A1 Sep. 12, 2024

(51) Int. Cl.
*G06F 40/40* (2020.01)
(52) U.S. Cl.
CPC ................................... *G06F 40/40* (2020.01)
(58) Field of Classification Search
USPC .......................................................... 704/9
See application file for complete search history.

(56) References Cited

U.S. PATENT DOCUMENTS

| | | | |
|---|---|---|---|
| 8,898,140 B2 | 11/2014 | Cooper et al. | |
| 9,262,528 B2 | 2/2016 | Cooper et al. | |
| 9,620,147 B2 | 4/2017 | Deshmukh et al. | |
| 9,661,067 B2 | 5/2017 | Seth et al. | |
| 9,886,950 B2 | 2/2018 | Karov et al. | |
| 10,740,566 B2 | 8/2020 | Sapugay et al. | |
| 11,132,988 B1 * | 9/2021 | Steedman Henderson .................. G10L 15/22 | |
| 11,315,551 B2 | 4/2022 | Penta et al. | |
| 11,816,437 B2 * | 11/2023 | Gupta ................... G06F 40/279 | |
| 2017/0024288 A1 | 1/2017 | Ahmed et al. | |
| 2021/0125025 A1 * | 4/2021 | Kuo ........................... G06N 3/08 | |
| 2023/0101424 A1 * | 3/2023 | Agrawal ................. G06F 18/41 705/7.39 | |
| 2023/0118962 A1 * | 4/2023 | Liu ........................ G06V 20/10 704/9 | |

FOREIGN PATENT DOCUMENTS

AU 2021201527 B2 3/2021

* cited by examiner

*Primary Examiner* — Pierre Louis Desir
(74) *Attorney, Agent, or Firm* — Holland & Hart LLP

(57) ABSTRACT

Methods, systems, and devices to support intent discovery using natural language interface are described. A computing system associated with an organization may perform intent discovery using a neuro-symbolic method to generate a set of intents for a set of conversation data sets. For example, the computing system may identify a set of hypotheses for a set of conversation data sets using domain-specific information. The computing system may use a natural language inference engine to generate, for each of a set of data pairs which each include a respective conversation data set and a respective hypothesis, a probability of whether the hypothesis of the data pair is positively entailed by the conversation data set of the data pair. For each probability that satisfies a threshold probability, the computing system may add the associated hypothesis to a set of generated intents.

18 Claims, 5 Drawing Sheets

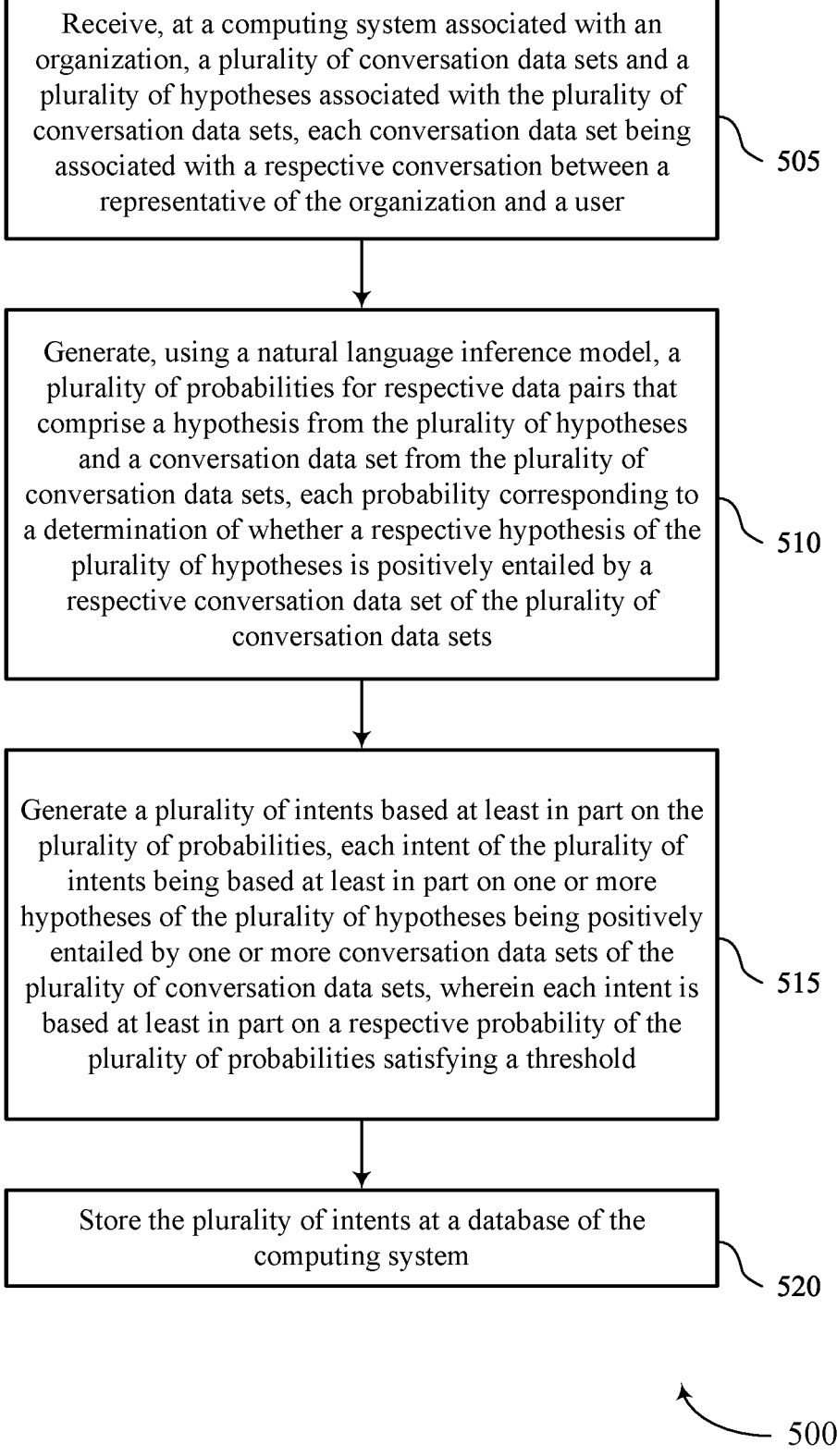

Receive, at a computing system associated with an organization, a plurality of conversation data sets and a plurality of hypotheses associated with the plurality of conversation data sets, each conversation data set being associated with a respective conversation between a representative of the organization and a user

505

Generate, using a natural language inference model, a plurality of probabilities for respective data pairs that comprise a hypothesis from the plurality of hypotheses and a conversation data set from the plurality of conversation data sets, each probability corresponding to a determination of whether a respective hypothesis of the plurality of hypotheses is positively entailed by a respective conversation data set of the plurality of conversation data sets

510

Generate a plurality of intents based at least in part on the plurality of probabilities, each intent of the plurality of intents being based at least in part on one or more hypotheses of the plurality of hypotheses being positively entailed by one or more conversation data sets of the plurality of conversation data sets, wherein each intent is based at least in part on a respective probability of the plurality of probabilities satisfying a threshold

515

Store the plurality of intents at a database of the computing system

INTENT DISCOVERY USING NATURAL LANGUAGE INFERENCE

FIELD OF TECHNOLOGY

The present disclosure relates generally to computer systems and software, and more specifically to intent discovery using natural language inference.

BACKGROUND

Companies and organizations, such as financial institutions, may support or provide conversational artificial intelligence (AI) systems, which may sometimes be referred to as chatbots, virtual agents, or the like. Such conversational AI systems may perform classification of intents (e.g., a goal a customer has in mind) from a user's input (e.g., speech and/or text input) for imitating human interactions. To perform such classification, a conversational AI system may use a predefined list of intent categories. However, classifying conversations into intents may be challenging, for example, due to natural language used by humans, which may go beyond linguistic features associated with text. For example, an utterance such as "authorize debit card use overseas" may correspond to an intent to put a travel notification alert on a customer's financial account, instead of an intent corresponding to the use of the debit card. A system that discovers and classifies intents beyond a correlation between words used in the text to the user's actual intent may therefore be desirable.

SUMMARY

The described techniques relate to improved methods, systems, devices, and apparatuses that support intent discovery using natural language inference. Generally, the described techniques provide for using neuro-symbolic schemes to generate a set of intents for a set of conversation data sets. For example, a computing system may identify a set of hypotheses (e.g., possible intents) for a set of conversation data sets using domain specific knowledge. In some cases, the computing system may utilize domain-specific information for the set of hypotheses, which may be obtained from domain experts (e.g., one or more individuals having knowledge or skills in a particular field). The computing system may use a natural language inference engine to generate, for data pairs that each include a respective conversation data set and a respective hypothesis, a probability of whether the hypothesis is true (e.g., is positively entailed by) the conversation data set. For each probability that satisfies a threshold, the computing system may add the associated hypothesis to a set of generated intents. Using such a neuro-symbolic method may allow for the incorporation of domain-specific knowledge into intent generation, improve adaptability of symbolic methods, and improve overly-broad generalizations of neural methods, among other advantages.

A method is described. The method may include receiving, at a computing system associated with an organization, a plurality of conversation data sets and a plurality of hypotheses associated with the plurality of conversation data sets, each conversation data set being associated with a respective conversation between a representative of the organization and a user, generating, using a natural language inference model, a plurality of probabilities for respective data pairs that comprise a hypothesis from the plurality of hypotheses and a conversation data set from the plurality of conversation data sets, each probability corresponding to a determination of whether a respective hypothesis of the plurality of hypotheses is positively entailed by a respective conversation data set of the plurality of conversation data sets, generating a plurality of intents based at least in part on the plurality of probabilities, each intent of the plurality of intents being based at least in part on one or more hypotheses of the plurality of hypotheses being positively entailed by one or more conversation data sets of the plurality of conversation data sets, wherein each intent is based at least in part on a respective probability of the plurality of probabilities satisfying a threshold, and storing the plurality of intents at a database of the computing system.

An apparatus is described. The apparatus may include a processor, memory coupled with the processor, and instructions stored in the memory. The instructions may be executable by the processor to cause the apparatus to receive, at a computing system associated with an organization, a plurality of conversation data sets and a plurality of hypotheses associated with the plurality of conversation data sets, each conversation data set being associated with a respective conversation between a representative of the organization and a user, generate, using a natural language inference model, a plurality of probabilities for respective data pairs that comprise a hypothesis from the plurality of hypotheses and a conversation data set from the plurality of conversation data sets, each probability corresponding to a determination of whether a respective hypothesis of the plurality of hypotheses is positively entailed by a respective conversation data set of the plurality of conversation data sets, generate a plurality of intents based at least in part on the plurality of probabilities, each intent of the plurality of intents being based at least in part on one or more hypotheses of the plurality of hypotheses being positively entailed by one or more conversation data sets of the plurality of conversation data sets, wherein each intent is based at least in part on a respective probability of the plurality of probabilities satisfying a threshold, and store the plurality of intents at a database of the computing system.

Another apparatus is described. The apparatus may include means for receiving, at a computing system associated with an organization, a plurality of conversation data sets and a plurality of hypotheses associated with the plurality of conversation data sets, each conversation data set being associated with a respective conversation between a representative of the organization and a user, means for generating, using a natural language inference model, a plurality of probabilities for respective data pairs that comprise a hypothesis from the plurality of hypotheses and a conversation data set from the plurality of conversation data sets, each probability corresponding to a determination of whether a respective hypothesis of the plurality of hypotheses is positively entailed by a respective conversation data set of the plurality of conversation data sets, means for generating a plurality of intents based at least in part on the plurality of probabilities, each intent of the plurality of intents being based at least in part on one or more hypotheses of the plurality of hypotheses being positively entailed by one or more conversation data sets of the plurality of conversation data sets, wherein each intent is based at least in part on a respective probability of the plurality of probabilities satisfying a threshold, and means for storing the plurality of intents at a database of the computing system.

A non-transitory computer-readable medium storing code is described. The code may include instructions executable by a processor to receive, at a computing system associated with an organization, a plurality of conversation data sets and a plurality of hypotheses associated with the plurality of conversation data sets, each conversation data set being associated with a respective conversation between a representative of the organization and a user, generate, using a natural language inference model, a plurality of probabilities for respective data pairs that comprise a hypothesis from the plurality of hypotheses and a conversation data set from the plurality of conversation data sets, each probability corresponding to a determination of whether a respective hypothesis of the plurality of hypotheses is positively entailed by a respective conversation data set of the plurality of conversation data sets, generate a plurality of intents based at least in part on the plurality of probabilities, each intent of the plurality of intents being based at least in part on one or more hypotheses of the plurality of hypotheses being positively entailed by one or more conversation data sets of the plurality of conversation data sets, wherein each intent is based at least in part on a respective probability of the plurality of probabilities satisfying a threshold, and store the plurality of intents at a database of the computing system.

Some examples of the method, apparatuses, and non-transitory computer-readable medium described herein may further include operations, features, means, or instructions for identifying a plurality of additional hypotheses based at least in part on the plurality of intents, generating, using the natural language inference model, a plurality of additional probabilities for respective additional data pairs that comprise an additional hypothesis from the plurality of additional hypotheses and a respective conversation data set from the plurality of conversation data sets, each additional probability corresponding to a determination of whether a respective additional hypothesis of the plurality of additional hypotheses is positively entailed by a respective conversation data set of the plurality of conversation data sets, generating a plurality of additional intents based at least in part on the plurality of additional probabilities, each additional intent of the plurality of additional intents being based at least in part on one or more additional hypotheses of the plurality of additional hypotheses being positively entailed by one or more conversation data sets of the plurality of conversation data sets, wherein each additional intent may be based at least in part on a respective additional probability of the plurality of additional probabilities satisfying the threshold, and storing the plurality of additional intents at the database of the computing system.

Some examples of the method, apparatuses, and non-transitory computer-readable medium described herein may further include operations, features, means, or instructions for modifying the threshold to a revised threshold based at least in part on storing the plurality of intents, generating, using the natural language inference model, a plurality of additional probabilities for the respective data pairs that comprise the hypothesis from the plurality of hypotheses and the respective conversation data set from the plurality of conversation data sets, each additional probability corresponding to a determination of whether the respective hypothesis of the plurality of hypotheses may be positively entailed by the respective conversation data set of the plurality of conversation data sets, generating a plurality of additional intents based at least in part on generating the plurality of additional probabilities, each additional intent of the plurality of additional intents being based at least in part on the one or more respective hypotheses of the plurality of hypotheses being positively entailed by the one or more conversation data sets of the plurality of conversation data sets, wherein each additional intent may be based at least in part on a respective additional probability of the plurality of additional probabilities satisfying the revised threshold, and storing the plurality of additional intents at the database of the computing system.

In some examples of the method, apparatuses, and non-transitory computer-readable medium described herein, the natural language inference model comprises one or more bidirectional encoders and one or more autoregressive decoders.

In some examples of the method, apparatuses, and non-transitory computer-readable medium described herein, a conversation data set of the plurality of conversation data sets comprises text associated with an interaction between a representative of the organization and a user.

In some examples of the method, apparatuses, and non-transitory computer-readable medium described herein, the representative of the organization comprises an automated conversational application or a human agent.

In some examples of the method, apparatuses, and non-transitory computer-readable medium described herein, each hypothesis of the plurality of hypotheses comprises text corresponding to one or more conversation trends between one or more representatives of the organization and one or more users.

In some examples of the method, apparatuses, and non-transitory computer-readable medium described herein, the one or more conversation trends comprise an account payment, an account balance, a loan, a vehicle title, or any combination thereof.

In some examples of the method, apparatuses, and non-transitory computer-readable medium described herein, each hypothesis of the plurality of hypotheses may be based at least in part on domain knowledge associated with the plurality of conversation data sets.

Some examples of the method, apparatuses, and non-transitory computer-readable medium described herein may further include operations, features, means, or instructions for displaying the plurality of intents using a graphical user interface (GUI) associated with the computing system.

BRIEF DESCRIPTION OF THE DRAWINGS

FIG. 5 illustrates a flowchart showing methods that support intent discovery using natural language inference in accordance with aspects of the present disclosure.

DETAILED DESCRIPTION

Figure 1:
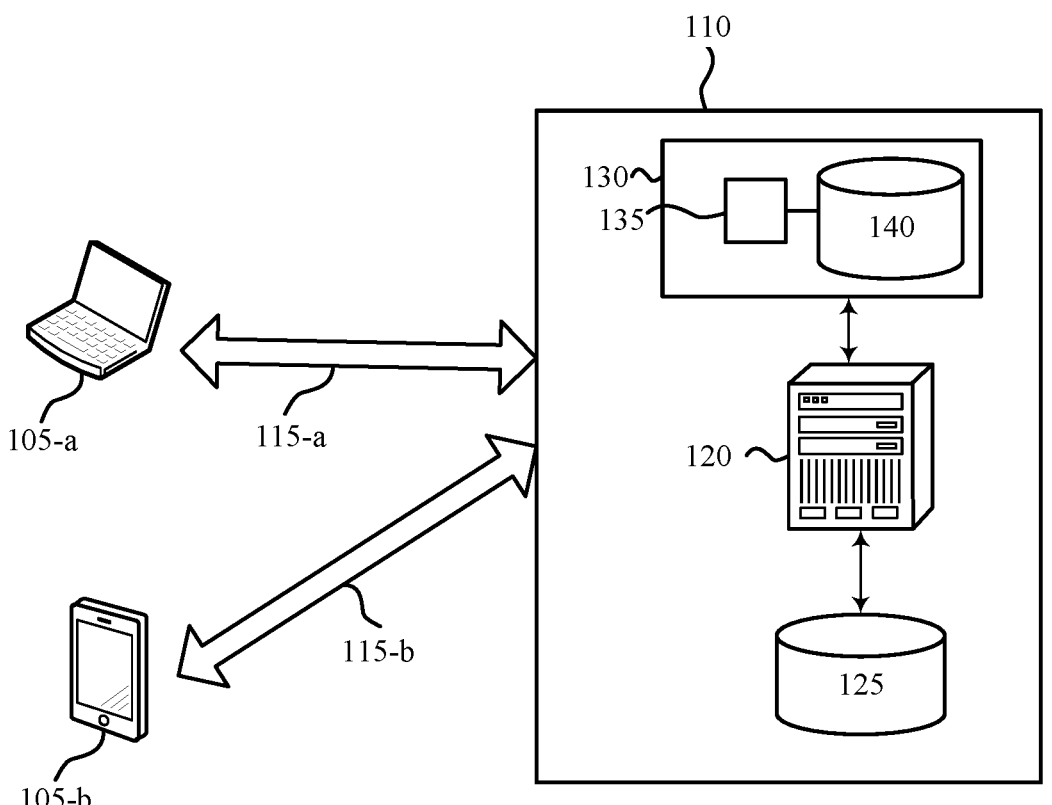
FIG. 1 illustrates an example of a system that supports intent discovery using natural language inference in accordance with aspects of the present disclosure.

Conversational artificial intelligence (AI) may be used by various organizations to provide enhanced availability of information to user and customers. Conversational AI may generally refer to chatbots, voice bots, virtual agents (e.g., virtual assistants), and other technologies that provide an interface for a user (e.g., a customer) to interact with a system, where such technologies may mimic or reproduce human-like conversations. For instance, a conversational AI may interact with a customer to provide information (e.g., information related to one or more accounts provided to the customer by the organization), perform actions (e.g., make changes) for the one or more accounts, route the customer to a representative of the organization, among other examples. The conversational AI may be used in various applications (e.g., customer service applications, websites, social media, online stores) to efficiently answer a user's questions and streamline routing of customer inquiries. To provide effective responses to a user's input, conversational AI may incorporate natural language processing and machine learning technologies, which may be based on a set of intents associated with conversations. An intent may represent a particular goal or outcome that the user is pursuing, for example, when contacting an organization.

Some conversational AI systems may support intent discovery by using relatively large sets of conversation data (e.g., audio or text representations of conversations, such as conversations between a user and a representative of an organization). For example, a conversational system may use one or more purely neural methods (e.g., based on deep-learning architectures), such as machine learning or topic modeling, to identify latent properties within sets of conversation data. However, such approaches may use a relatively large amount of training data and may provide overly broad intents, which may degrade the effectiveness of the system (e.g., resulting in erroneous predictions during inference). Alternatively, a conversational AI system may use one or more symbolic or rules-based methods (e.g., based on heuristics), such as preset (e.g., predefined) rules or algorithms to classify a conversation into an intent. Such approaches, however, may not account for alternate forms or variations of conversations, have inaccurate generalization, have limited applicability, have limited adaptability to multiple contexts, or any combination thereof.

As described herein, a computing system associated with an organization may perform intent discovery using a neuro-symbolic method, which may incorporate both neural methods (e.g., machine learning methods) and rules-based methods to generate a set of intents for a set of conversation data sets. For example, the computing system may identify a set of hypotheses (e.g., possible intents) for a set of conversation data sets using domain-specific knowledge. The set of hypotheses may be based on domain expertise, which may enable improved generation of intents by providing hypotheses that are specifically relevant to a conversation. The computing system may use a natural language inference engine to generate, for each of a set of data pairs that each include a respective conversation data set and a respective hypothesis, a probability of whether the hypothesis of the data pair is positively entailed by the conversation data set of the data pair. For each probability that satisfies a threshold (e.g., a configurable threshold), the computing system may include (e.g., add) the associated hypothesis in a set of generated intents. The set of generated intents may be used for the various functions of a conversational AI system provided by the organization.

Using such neuro-symbolic methods may enable the incorporation of domain-specific knowledge, improve adaptability of symbolic methods, improve overly broad generalizations of neural methods, among other advantages. Further, the described techniques may enable adaptation of pre-trained architectures for natural language inference, resulting in conversational AI systems being used in contexts with few training examples (e.g., few-shot learning). Here, few-shot learning may generally refer to machine learning systems trained to predict outputs based on relatively few (e.g., very few) training examples, as opposed to relatively large sets of training data. Such techniques may provide an advantage in cases where the training data is relatively limited, and the described techniques may accordingly enable predictions of intents using relatively few training examples. In some aspects, the described techniques may provide flexible implementation, enabling adaptation to multiple context and business use cases, as the described architecture may be configured to process any set of conversation data (e.g., conversation data between two humans, conversation data between a human and agent) as inputs.

Figure 2:
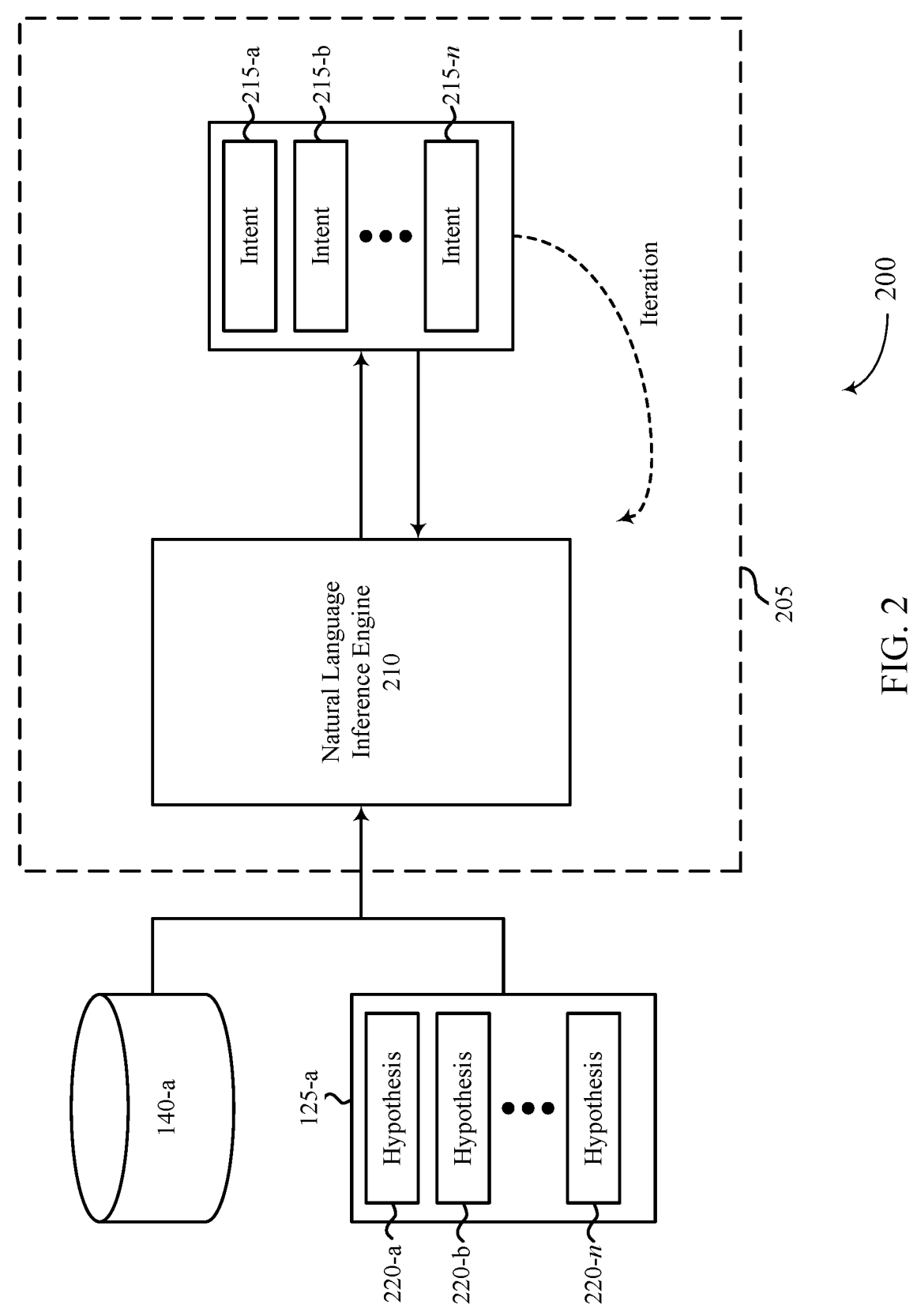
FIG. 2 illustrates an example of a system that supports intent discovery using natural language inference in accordance with aspects of the present disclosure.
Figure 3:
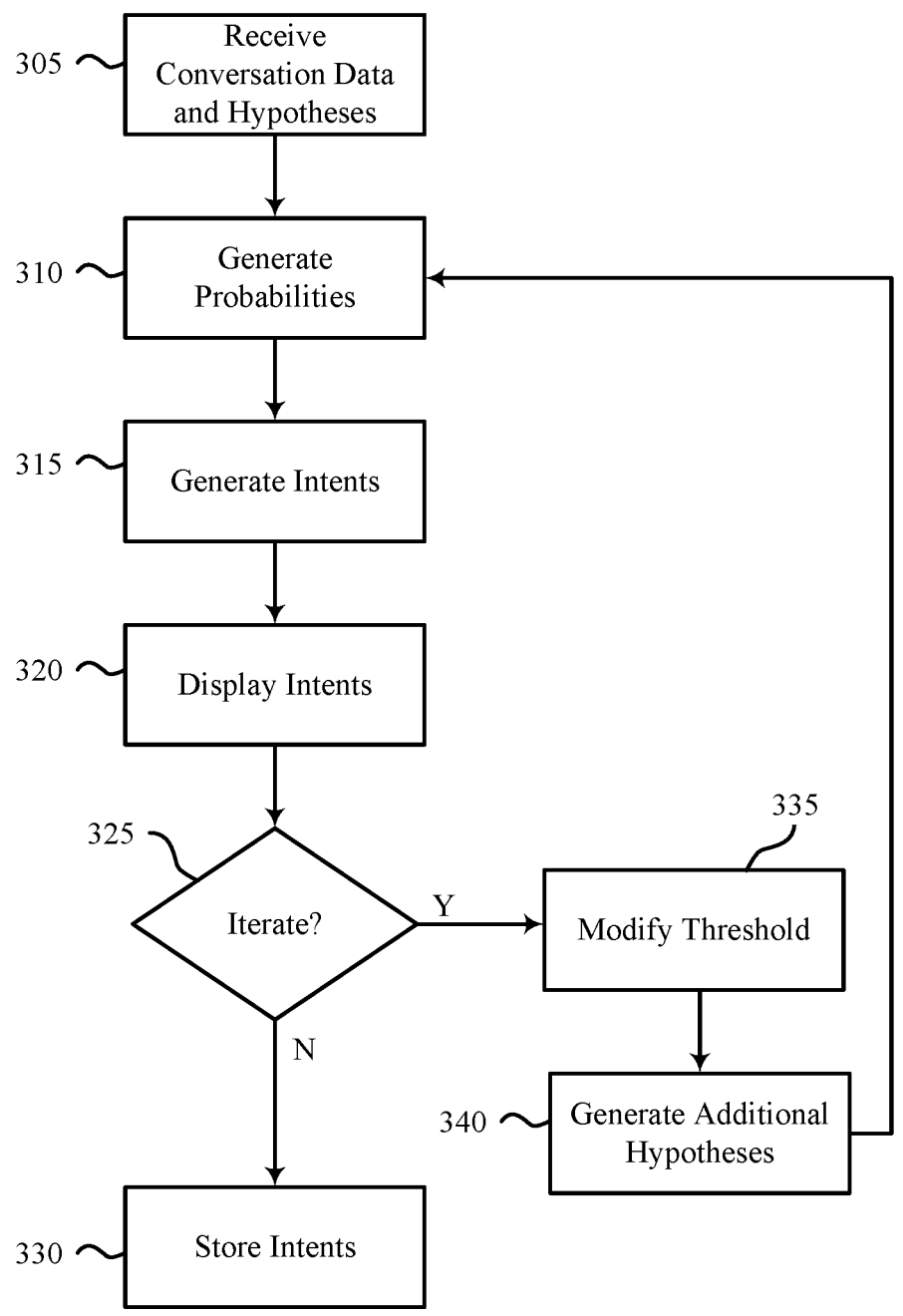
FIG. 3 illustrates an example of a process flow that supports intent discovery using natural language inference in accordance with aspects of the present disclosure.

Aspects of the disclosure are initially described in the context of systems and process flows with reference to FIGS. 1 through 3. Aspects of the disclosure are further illustrated by and described with reference to systems and flowcharts that relate to techniques for intent discovery using natural language inference with reference to FIGS. 4 and 5.

This description provides examples, and is not intended to limit the scope, applicability or configuration of the principles described herein. Rather, the ensuing description will provide those skilled in the art with an enabling description for implementing various aspects of the principles described herein. As can be understood by one skilled in the art, various changes may be made in the function and arrangement of elements without departing from the application.

It should be appreciated by a person skilled in the art that one or more aspects of the disclosure may be implemented in a system to additionally, or alternatively, solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

FIG. 1 illustrates an example of a system 100 that supports intent discovery using natural language inference in accordance with aspects of the present disclosure. The system 100 may include one or more devices 105 (e.g., a desktop computer, a laptop, a smartphone, a tablet, other computing system, or any combination thereof), which may interact with a system 110 associated with one or more organizations (e.g., entities, companies, banks, corporations, credit unions, lenders) over a network connection 115. The system 110 described herein may be associated with or may utilize one or more devices (e.g., computers, servers, databases, platforms, or the like), such as a server 120, a database 125, a communication center 130 (e.g., that includes one or more representatives 135 and one or more communication databases 140), or any combination thereof.

The network connections 115 (e.g., network connection 115-a, network connection 115-b, and so forth) may implement a transfer control protocol and internet protocol (TCP/IP), such as the Internet, or may implement other network protocols. The network connections 115 may be examples of one or more wired or wireless connections with the system 110, where bidirectional data may be communicated between the system 110 and the devices 105. As an example, the network connection 115-a may be an example of a wired connection that enables communications between the device 105-a and the system 110. The wired connection may include, for example, communications using Ethernet cables, fiber-optic communications, or other wireline communications. In other examples, the network connection 115-b may be an example of a wireless connection that enables communications between the device 105-b and the system 110. The wireless connection may include communications in accordance with one or more wireless communications or radio access technologies, such as Long Term Evolution (LTE) technologies, LTE-Advanced (LTE-A) technologies, fifth generation (5G) technologies (which may be referred to as New Radio (NR) technologies), wireless local area network (WLAN) technologies, such as Wi-Fi (i.e., Institute of Electrical and Electronics Engineers (IEEE) 802.11), among other examples.

In some cases, messaging between the system 110 and the one or more devices 105 (e.g., a device 105-a, a device 105-b, and so forth) may be supported by a core network providing user authentication, access authorization, tracking, Internet Protocol (IP) connectivity, and other access, routing, or mobility functions. The core network, for example, may be an evolved packet core (EPC) or 5G core (5GC), which may include at least one control plane entity that manages access and mobility and at least one user plane entity that routes packets or interconnects to external networks. In some aspects, user IP packets may be transferred through the user plane entity, which may provide IP address allocation as well as other functions. The user plane entity may be connected to IP services for one or more network operators. The IP services may include access to the Internet, Intranet(s), an IP Multimedia Subsystem (IMS), or a Packet-Switched Streaming Service.

The server 120 may include a framework in which to run the one or more applications associated with the one or more devices 105. For example, the server 120 may be an application server and may implement system software on which the applications may run. More generally, the server 120 may provide a software framework for creating and running applications. As such, the server 120 may support administrative functions for creating, modifying, or otherwise managing various applications. For example, an administrative user or software developer may create and customize an application using various software or components of the server 120 (e.g., an application builder, an application programming interface (API), or other application tools). The server 120 may support building applications or pages that may be rendered on a number of different user interface types at the devices 105 (e.g., including different types and versions of devices 105). In some cases, the server 120 may perform data processing, and the server 120 may be an example of a cloud device or may be located at a data center. The server 120 may support serving dynamic content and transferring applications or application data from one device 105 to another. In some cases, the server 120 may further provide for hosting business logic applications and processes using various protocols.

The system 110 may support communications (e.g., text-based communications, voice communications) between a user associated with the one or more devices 105 and one or more representatives 135 of the organization. Such voice communications may include, for example, IP telephony (e.g., voice over IP (VoIP) communications) for the delivery of voice communications and multimedia sessions over an IP network (e.g., the Internet). Voice communications may include inbound calls from the one or more devices 105 to the representative 135. Text-based communications may include, for example, electronic messaging from the one or more devices 105 to the system 110. For instance, via the one or more devices 105, the user may input text into an interface (e.g., a text messaging interface, an interface provided by a website of the organization, or the like) for sending one or more messages to the organization. In such cases, the one or more devices 105 may transmit a text-based inquiry or request to the organization, which may be received and responded to by the representative 135. In some examples, the representative 135 may be an example of an automated conversational application (e.g., a conversational AI system or platform), such as a chatbot managed by the server 120. Additionally, or alternatively, the representative 135 may be an example of an employee or associate of the organization (e.g., a human agent), such as a customer service representative.

In some examples, the communications may be examples of support or customer service communications provided by the organization to a user. For example, the user may initiate communications the organization to obtain information about one or more accounts associated with the user, to complete or obtain information about payments to the organization (e.g., loan payments, mortgage payments), to modify an account (e.g., to open or close an account), and the like. To support analytics of user behavior, the system 110 may store the communications in a communications database 140. For example, the system 110 may store audio recordings of voice communications between a user and a representative 135, text transcriptions of the audio recordings, text conversations between a user and a representative 135 using text-based input, or a combination thereof, which may be referred to herein as conversations data sets.

The organization may analyze data stored in the communications database 140. For example, the organization may identify conversation trends, common questions asked by users, common user requests, or the like, to determine intents (e.g., user intents). To identify intents, the system may include one or more language models (e.g., large language models that implement machine learning techniques), which may be used to perform natural language inference on a conversation data set to classify the conversation data set into one or more intents. A language model may be associated with probability distributions over a set of words, where the language model may assign a probability to a sequence of words. Language models (e.g., for natural language processing) may include various types of machine learning models, for example, including unigram, n-gram, and neural network, among other types. Performing natural language inference may include using one or more machine learning techniques on a language model, for example, to determine whether a conversation data set is positively entailed by an intent. By way of example, for a data pair of a conversation data set that includes a statement by the user such as "I would like to make a payment" and an intent such "this conversation is about payments," the natural language inference model may determine that the intent positively entails the conversation data set. Alternatively, for an intent such as "this conversation is about a vehicle title," the natural language inference model may determine that the intent does not entail the conversation data set.

In some examples, one or more possible intents may be selected prior to performing natural language inference (e.g., the possible intents may be fixed or pre-determined, such as by an administrator of the system 110). The breadth and selection of the possible intents may affect the quality of analytics associated with the conversation data sets. For example, a relatively high number of overly-narrow intents may classify similar conversation data sets into separate intents, while an overly-broad intent may classify dissimilar conversation data sets into the same intent, and thus mask potential data trends in the conversation data sets.

To determine an effective selection of possible intents, the system 110 may use a neuro-symbolic method to perform intent discovery. Neuro-symbolic techniques may refer to AI technologies that incorporate neural AI architectures and symbolic AI architectures (e.g., using logic and language processing to generate predictions). Here, neural architectures may include machine learning algorithms, such as neural networks (e.g., artificial neural networks) such as a feed forward (FF) or deep feed forward (DFF) neural network, a recurrent neural network (RNN), a long short-term memory (LSTM) neural network, or any other type of neural network. However, any other machine learning algorithms may be supported. For example, the machine learning algorithm may implement a nearest neighbor algorithm, a linear regression algorithm, a Naïve Bayes algorithm, a random forest algorithm, or any other machine learning algorithm. Further, the machine learning process may involve supervised learning, unsupervised learning, semi-supervised learning, reinforcement learning, or any combination thereof. The machine learning algorithm may include an input layer, one or more hidden layers, and an output layer. Symbolic architectures may be based on symbols that are defined and manipulated, for example, based on structures and behavioral rules. As an example, a symbolic AI may be based on object-oriented programming (OOP) languages for defining classes, specifying properties of the classes, as well as organizing the classes into categories.

In accordance with the neuro-symbolic techniques described herein, the system 110 may identify a set of hypotheses (e.g., possible intents) for a set of conversation data sets using domain-specific information. The system 110 may obtain the set of hypotheses from domain experts, which may be stored in a database 125 (e.g., a domain knowledge database). The system 110 may use a natural language inference engine to generate, for each of a set of data pairs that each include a respective conversation data set and a respective hypothesis, a probability of whether the hypothesis of the data pair is positively entailed by the conversation data set of the data pair (e.g., a probability of whether the hypothesis is true). For each probability that satisfies a threshold probability, the system 110 may add the associated hypothesis to a set of generated intents. Using such a neuro-symbolic method may allow for the incorporation of domain specific knowledge, may improve adaptability of symbolic methods, may improve overly broad generalizations of neural methods, or a combination thereof.

FIG. 2 illustrates an example of a system 200 that supports intent discovery using natural language inference in accordance with aspects of the present disclosure. The system 200 may include or implement aspects of a natural language inference model (e.g., a large language machine learning model), such as the natural language inference models described with reference to FIG. 1. For example, the system 200 may include a natural language inference model 205 configured to generate, using a natural language inference engine 210, a set of intents 215 using a set of conversation data sets stored in a communications database 140-a as a first input and a set of hypotheses 220 as a second input.

The communications database 140-a may be an example of the communications database 140 as described with reference to FIG. 1, and may include one or more conversation data sets associated with interactions (e.g., voice communications, text communications) between a user and one or more representatives of an organization. A set of hypotheses 220 (e.g., hypothesis 220-a, hypothesis 220-b, through hypothesis 220-n) may be used to derive or classify possible intents 215 (e.g., intent 215-a, intent 215-b, through intent 215-n). The set of hypotheses 220 may be associated with conversation data, such as requests from a user for information associated with an account of the user (e.g., questions about a payment on the account, questions about an account balance, questions about a loan, questions about a vehicle title, or the like).

The set of hypotheses 220 may be associated with domain information (e.g., domain knowledge, business use cases), and may be stored in a domain knowledge database 125-a. In some cases, one or more domain experts may select and generate the set of hypotheses 220 using domain knowledge (e.g., knowledge associated with common conversation data trends of interest to the organization). As an example, domain knowledge may refer to some information related to a particular process, service, or function (e.g., associated with the organization), which may relate to specific types of requests by or conversations with users for those processes, services, or functions. As an illustrative example, domain knowledge associated with one or more accounts (e.g., accounts associated with a vehicle lease) may include various data and information indicating frequent questions or inquiries from customers regarding lease termination, dealership locations for vehicle grounding, payments, end-of-lease buyouts, or the like. Domain knowledge may generally refer to information collected based on an understanding of an industry or activity, for example, associated with the organization (e.g., business goals, procedures and practices, operational parameters, or the like). Incorporating domain knowledge for natural language processing and intent identification may allow for improved accuracy and analytic insight of the generated intents 215, and may improve performance of the natural language inference model 205.

The natural language inference engine 210 may generate a probability for each of a set of data pairs, each data pair corresponding to a conversation data set stored in the communications database 140-a and a hypothesis 220, and each probability representing a probability that a hypothesis 220 of a data pair is positively entailed by a conversation data set of the data pair. To determine whether a hypothesis 220 of a data pair is positively entailed by a conversation data set of the data pair, the natural language inference model 205 may determine whether the generated probability satisfies (e.g., exceeds) a threshold. If the generated probability satisfies the threshold, the natural language inference model 205 may add an intent 215 (e.g., intent 215-a) associated with a particular hypothesis 220 (e.g., hypothesis 220-a) to the set of intents 215. In some cases, the threshold may be configurable. In some examples, the natural language inference model 205 may maintain one or more counters to track a quantity of data pairs that satisfy the threshold for each intent 215 (e.g., may track a quantity of conversation data sets positively entailed by each intent 215).

In some cases, the natural language inference model 205 may support iterative intent discovery. For example, after generating a probability for an intent 215 associated with a hypothesis 220 and comparing the probability to the threshold for each data pair, the natural language inference model 205 may identify or generate an additional set of hypotheses 220. The natural language inference model 205 may accordingly generate a set of additional probabilities corresponding to data pairs of the additional set of hypotheses 220 and the set of conversation data sets, data pairs of the original set of hypotheses 220 and the set of conversation data sets, or both. The natural language inference model 205 may determine whether each of the generated probabilities satisfies (e.g., exceeds) the threshold (which may be a same threshold or a different threshold) for respective intents 215 associated with one or more hypotheses 220. If a generated probability satisfies the threshold, the natural language inference model 205 may add the intent 215 (e.g., intent 215-*b*) to the set of intents 215.

In some examples, to generate the additional hypotheses 220, the natural language inference model 205 may display the set of intents 215, for example to a user using a graphical user interface (GUI). The user may, based on the displayed intents 215, select one or more additional hypotheses 220 (e.g., from the domain knowledge database 125-*a*), and input the selected hypotheses 220 to the natural language inference model 205 via the GUI. In some examples, the natural language inference model 205 may support further configuration, such by modifying the threshold based on user input via the GUI.

The natural language inference engine 210 may be an example of a machine learning model configured to perform natural language inference. For example, the natural language inference model engine may include one or more bidirectional encoders and one or more autoregressive decoders. The natural language inference engine 210 may use a large natural language inference model or other pre-trained architectures, which may allow the natural language inference engine 210 to extract linguistic information using a relatively small quantity of training examples (e.g., using few-shot learning or zero-shot learning). Accordingly, the natural language inference engine 210 may be able to adapt to multiple use cases, which may improve the flexibility and breadth of application of the natural language inference model 205.

FIG. 3 illustrates an example of a process flow 300 that supports intent discovery using natural language inference in accordance with aspects of the present disclosure. The process flow 300 or aspects thereof may be implemented by a system associated with an organization (e.g., a server 120 associated with an organization). The system may provide functionality for, or support aspects of, a system managed by an organization. For example, the system may include or may implement the natural language inference model 205 as described with reference to FIG. 2. In the following description of the process flow 300, the operations may be performed in a different order than the order shown. For example, specific operations may also be left out of the process flow 300, or other operations may be added to process flow 300.

The process flow 300 may illustrate a method to generate a set of intents using a first input of one or more conversation data sets and a second input of one or more hypotheses. For example, at 305, the system may receive one or more conversation data sets and may receive one or more hypotheses associated with the one or more conversation data sets. The system may obtain the one or more conversation data sets from a communications database (e.g., the communications database 140, the communications database 140-*a*), and may receive the one or more hypotheses from a domain knowledge database (e.g., the domain knowledge database 125, the domain knowledge database 125-*a*).

At 310, the system may generate, using a natural language inference engine (e.g., the natural language inference engine 210), a set of probabilities corresponding to a set of data pairs. The set of data pairs may include a data pair for each conversation data set of the one or more conversation data sets and each hypothesis of the set of hypotheses. Each probability may represent a probability that the hypothesis of the associated data pair is positively entailed by the conversation data set of the data pair.

At 315, the system may generate a set of intents using the probabilities generated at 310. For example, the system may compare the probability associated with each data pair to a threshold to determine whether the probability exceeds the threshold. If the probability exceeds the threshold, the system may add the hypothesis to the set of intents. In some examples, the system may maintain one or more counters, each counter corresponding to a respective intent. Each counter may track a quantity of conversation data sets that are positively entailed by the associated intent (e.g., that are true). Tracking such quantities may provide analytic insight into the set of intents, for example, by providing an indication of the relative breadth of each intent.

At 320, the system may optionally display the set of intents to a system administrator of the system via a GUI. In some examples, the GUI may allow the system administrator to store the set of intents, or to iterate on the generated set of intents. For example, the system may transmit or provide a prompt, via the GUI, to the system administrator. The system administrator (e.g., via a device) may provide a response to the prompt, which may include inputting, via the GUI, an indication of whether to iterate on the generated set of intents.

At 325, the system may determine, using the input indication, whether the iterate on the generated set of intents. If the system (e.g., a system administrator of the system) determines not to iterate, the system may, at 330, store the generated set of intents, for example at a database of the system.

In some examples, at 335, the system may modify the threshold, which may allow for increased control and analysis of the generated intents. For example, the system may display, via the GUI, a third prompt to modify the threshold. The system administrator may provide a response to the third prompt by inputting a revised threshold.

Alternatively, if the system determines to iterate, the system may, at 335, generate one or more additional hypotheses. For example, the system may transmit or display a second prompt to the system administrator to select or input one or more additional hypotheses (e.g., select from the domain knowledge database). The system administrator may provide a response to the second prompt by inputting the selected additional hypotheses. In some examples, the system administrator may additionally select a subset of the one or more original hypotheses. Accordingly, the one or more additional hypotheses may include hypotheses input by the system administrator, hypotheses of the original one or more hypotheses, or both. The process flow 300 may return to 310, and the system may generate additional probabilities and intents using the additional one or more hypotheses and, in some cases, the revised threshold.

Figure 4:
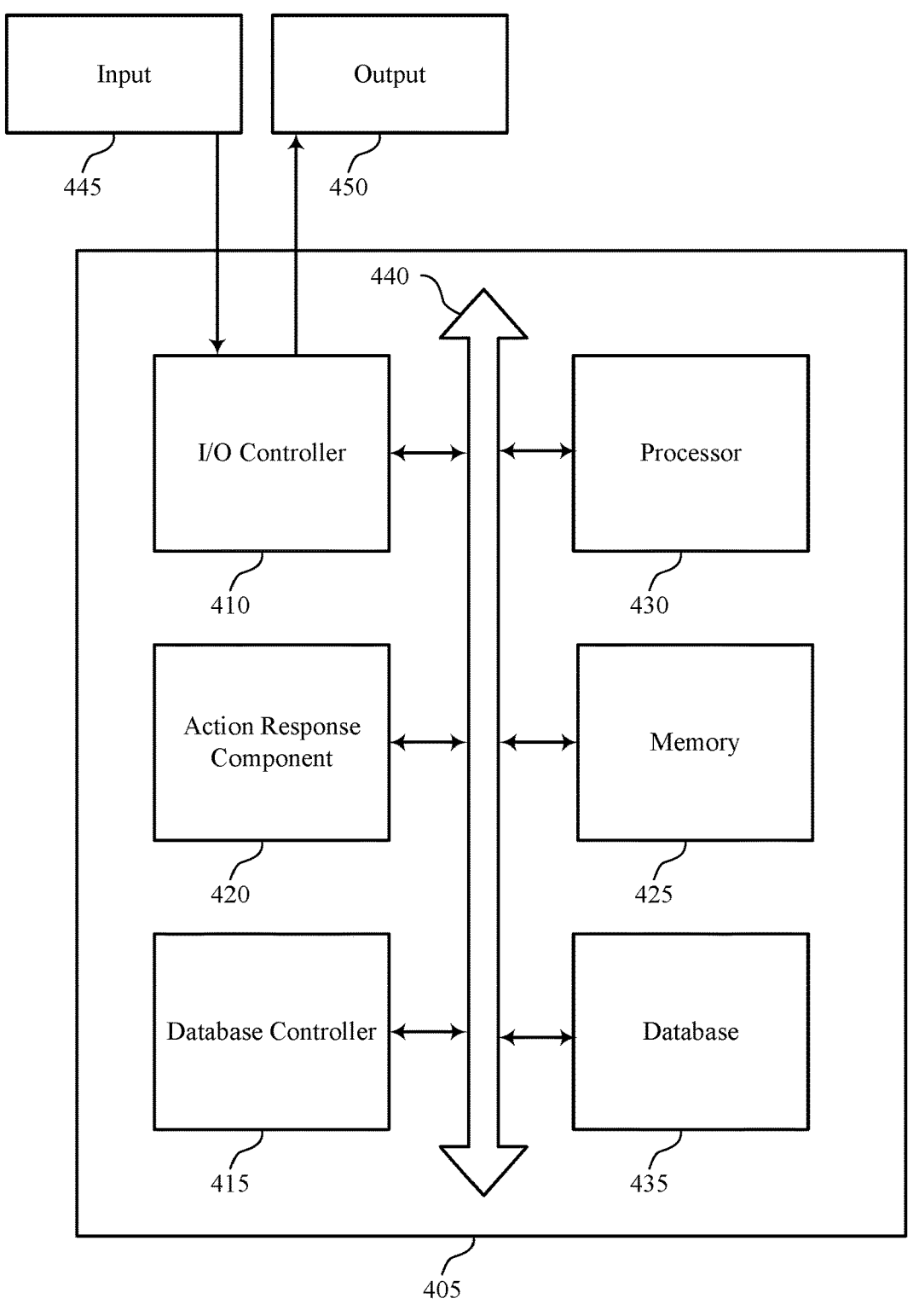
FIG. 4 illustrates a diagram of a system including a device that supports intent discovery using natural language inference in accordance with aspects of the present disclosure.

FIG. 4 illustrates a diagram of a system 400 including a device 405 that supports intent discovery using natural language inference in accordance with aspects of the present disclosure. The device 405 may include components for bi-directional voice and data communications including components for transmitting and receiving communications, such as an action response component 420, an I/O controller 410, a database controller 415, a memory 425, a processor 430, and a database 435. These components may be in electronic communication or otherwise coupled (e.g., operatively, communicatively, functionally, electronically, electrically) via one or more buses (e.g., a bus 440).

The I/O controller 410 may manage input signals 445 and output signals 450 for the device 405. The I/O controller 410 may also manage peripherals not integrated into the device 405. In some cases, the I/O controller 410 may represent a physical connection or port to an external peripheral. In some cases, the I/O controller 410 may utilize an operating system such as iOS®, ANDROID®, MS-DOS®, MS-WIN-DOWS®, OS/2®, UNIX®, LINUX®, or another known operating system. Additionally, or alternatively, the I/O controller 410 may represent or interact with a modem, a keyboard, a mouse, a touchscreen, or a similar device. In some cases, the I/O controller 410 may be implemented as part of a processor. In some examples, a user may interact with the device 405 via the I/O controller 410 or via hardware components controlled by the I/O controller 410.

The database controller 415 may manage data storage and processing in a database 435. The database 435 may be external to the device 405, temporarily or permanently connected to the device 405, or a data storage component of the device 405. In some cases, a user may interact with the database controller 415. In some other cases, the database controller 415 may operate automatically without user interaction. The database 435 may be an example of a persistent data store, a single database, a distributed database, multiple distributed databases, a database management system, or an emergency backup database.

Memory 425 may include random-access memory (RAM) and read-only memory (ROM). The memory 425 may store computer-readable, computer-executable software including instructions that, when executed, cause the processor to perform various functions described herein. In some cases, the memory 425 may contain, among other things, a basic input/output system (BIOS), which may control basic hardware or software operation such as the interaction with peripheral components or devices.

The processor 430 may include an intelligent hardware device (e.g., a general-purpose processor, a digital signal processor (DSP), a central processing unit (CPU), a micro-controller, an application-specific integrated circuit (ASIC), a field-programmable gate array (FPGA), a programmable logic device, a discrete gate or transistor logic component, a discrete hardware component, or any combination thereof). In some cases, the processor 430 may be configured to operate a memory array using a memory controller. In some other cases, a memory controller may be integrated into the processor 430. The processor 430 may be configured to execute computer-readable instructions stored in memory 425 to perform various functions (e.g., functions or tasks supporting intent discovery using natural language inference).

For example, the action response component 420 may be configured as or otherwise support a means for receiving, at a computing system associated with an organization, a plurality of conversation data sets and a plurality of hypotheses associated with the plurality of conversation data sets, each conversation data set being associated with a respective conversation between a representative of the organization and a user. The action response component 420 may be configured as or otherwise support a means for generating, using a natural language inference model, a plurality of probabilities for respective data pairs that include a hypothesis from the plurality of hypotheses and a conversation data set from the plurality of conversation data sets, each probability corresponding to a determination of whether a respective hypothesis of the plurality of hypotheses is positively entailed by a respective conversation data set of the plurality of conversation data sets. The action response component 420 may be configured as or otherwise support a means for generating a plurality of intents based on the plurality of probabilities, each intent of the plurality of intents being based on one or more hypotheses of the plurality of hypotheses being positively entailed by one or more conversation data sets of the plurality of conversation data sets, where each intent is based on a respective probability of the plurality of probabilities satisfying a threshold. The action response component 420 may be configured as or otherwise support a means for storing the plurality of intents at a database of the computing system.

FIG. 5 illustrates a flowchart showing a method 500 that supports intent discovery using natural language inference in accordance with aspects of the present disclosure. The operations of the method 500 may be implemented by a device or its components as described herein. For example, the operations of the method 500 may be performed by a device as described with reference to FIGS. 1 through 4. In some examples, a device may execute a set of instructions to control the functional elements of the device to perform the described functions. Additionally, or alternatively, the device may perform aspects of the described functions using special-purpose hardware.

At 505, the method may include receiving, at a computing system associated with an organization, a plurality of conversation data sets and a plurality of hypotheses associated with the plurality of conversation data sets, each conversation data set being associated with a respective conversation between a representative of the organization and a user. The operations of 505 may be performed in accordance with examples as disclosed herein.

At 510, the method may include generating, using a natural language inference model, a plurality of probabilities for respective data pairs that include a hypothesis from the plurality of hypotheses and a conversation data set from the plurality of conversation data sets, each probability corresponding to a determination of whether a respective hypothesis of the plurality of hypotheses is positively entailed by a respective conversation data set of the plurality of conversation data sets. The operations of 510 may be performed in accordance with examples as disclosed herein.

At 515, the method may include generating a plurality of intents based on the plurality of probabilities, each intent of the plurality of intents being based on one or more hypotheses of the plurality of hypotheses being positively entailed by one or more conversation data sets of the plurality of conversation data sets, where each intent is based on a respective probability of the plurality of probabilities satisfying a threshold. The operations of 515 may be performed in accordance with examples as disclosed herein.

At 520, the method may include storing the plurality of intents at a database of the computing system. The operations of 520 may be performed in accordance with examples as disclosed herein.

In some examples, an apparatus as described herein may perform a method or methods, such as the method 500. The apparatus may include features, circuitry, logic, means, or instructions (e.g., a non-transitory computer-readable medium storing instructions executable by a processor) for receiving, at a computing system associated with an organization, a plurality of conversation data sets and a plurality of hypotheses associated with the plurality of conversation data sets, each conversation data set being associated with a respective conversation between a representative of the organization and a user, generating, using a natural language inference model, a plurality of probabilities for respective data pairs that include a hypothesis from the plurality of hypotheses and a conversation data set from the plurality of conversation data sets, each probability corresponding to a determination of whether a respective hypothesis of the plurality of hypotheses is positively entailed by a respective conversation data set of the plurality of conversation data sets, generating a plurality of intents based on the plurality of probabilities, each intent of the plurality of intents being based on one or more hypotheses of the plurality of hypotheses being positively entailed by one or more conversation data sets of the plurality of conversation data sets, where each intent is based on a respective probability of the plurality of probabilities satisfying a threshold, and storing the plurality of intents at a database of the computing system.

Some examples of the method 500 and the apparatus described herein may further include operations, features, means, or instructions for identifying a plurality of additional hypotheses based on the plurality of intents, generating, using the natural language inference model, a plurality of additional probabilities for respective additional data pairs that include an additional hypothesis from the plurality of additional hypotheses and a respective conversation data set from the plurality of conversation data sets, each additional probability corresponding to a determination of whether a respective additional hypothesis of the plurality of additional hypotheses is positively entailed by a respective conversation data set of the plurality of conversation data sets, generating a plurality of additional intents based on the plurality of additional probabilities, each additional intent of the plurality of additional intents being based on one or more additional hypotheses of the plurality of additional hypotheses being positively entailed by one or more conversation data sets of the plurality of conversation data sets, where each additional intent may be based on a respective additional probability of the plurality of additional probabilities satisfying the threshold, and storing the plurality of additional intents at the database of the computing system.

Some examples of the method 500 and the apparatus described herein may further include operations, features, means, or instructions for modifying the threshold to a revised threshold based on storing the plurality of intents, generating, using the natural language inference model, a plurality of additional probabilities for the respective data pairs that include the hypothesis from the plurality of hypotheses and the respective conversation data set from the plurality of conversation data sets, each additional probability corresponding to a determination of whether the respective hypothesis of the plurality of hypotheses may be positively entailed by the respective conversation data set of the plurality of conversation data sets, generating a plurality of additional intents based on generating the plurality of additional probabilities, each additional intent of the plurality of additional intents being based on the one or more respective hypotheses of the plurality of hypotheses positively entailing the one or more conversation data sets of the plurality of conversation data sets, where each additional intent may be based on a respective additional probability of the plurality of additional probabilities satisfying the revised threshold, and storing the plurality of additional intents at the database of the computing system.

In some examples of the method 500 and the apparatus described herein, the natural language inference model includes one or more bidirectional encoders and one or more autoregressive decoders.

In some examples of the method 500 and the apparatus described herein, a conversation data set of the plurality of conversation data sets includes text associated with an interaction between a representative of the organization and a user.

In some examples of the method 500 and the apparatus described herein, the representative of the organization includes an automated conversational application or a human agent.

In some examples of the method 500 and the apparatus described herein, each hypothesis of the plurality of hypotheses includes text corresponding to one or more conversation trends between one or more representatives of the organization and one or more users.

In some examples of the method 500 and the apparatus described herein, the one or more conversation trends include an account payment, an account balance, a loan, a vehicle title, or any combination thereof.

In some examples of the method 500 and the apparatus described herein, each hypothesis of the plurality of hypotheses may be based on domain knowledge associated with the plurality of conversation data sets.

Some examples of the method 500 and the apparatus described herein may further include operations, features, means, or instructions for displaying the plurality of intents using a GUI associated with the computing system.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for consumer preference and maintenance interface.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The functions of each unit may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:

receiving, at a computing system associated with an organization, a plurality of conversation data sets, each conversation data set being associated with a respective conversation between a representative of the organization and a user;

receiving, at the computing system and from a domain knowledge database, a plurality of hypotheses associated with the plurality of conversation data sets, wherein each hypothesis of the plurality of hypotheses is based at least in part on domain-specific information applicable to an industry or activity, or both;

generating, using a natural language inference model, a plurality of probabilities for respective data pairs that each comprise a hypothesis from the plurality of hypotheses and a conversation data set from the plurality of conversation data sets, each probability corresponding to a determination of whether a respective hypothesis of the plurality of hypotheses is positively entailed by a respective conversation data set of the plurality of conversation data sets, wherein the natural language inference model comprises one or more bidirectional encoders and one or more autoregressive decoders;

generating, using neuro-symbolic techniques and incorporation of the domain-specific information, a plurality of intents based at least in part on the plurality of probabilities, each intent of the plurality of intents being based at least in part on one or more hypotheses of the plurality of hypotheses being positively entailed by one or more conversation data sets of the plurality of conversation data sets, wherein each intent is based at least in part on a respective probability of the plurality of probabilities satisfying a threshold, wherein the neuro-symbolic techniques comprise one or more neural architectures for language processing and one or more symbolic architectures for classifying respective intents; and storing the plurality of intents at a database of the computing system.

2. The method of claim 1, further comprising:

identifying a plurality of additional hypotheses based at least in part on the plurality of intents;

generating, using the natural language inference model, a plurality of additional probabilities for respective additional data pairs that comprise an additional hypothesis from the plurality of additional hypotheses and a respective conversation data set from the plurality of conversation data sets, each additional probability corresponding to a determination of whether a respective additional hypothesis of the plurality of additional hypotheses is positively entailed by the respective conversation data set of the plurality of conversation data sets;

generating a plurality of additional intents based at least in part on the plurality of additional probabilities, each additional intent of the plurality of additional intents being based at least in part on one or more additional hypotheses of the plurality of additional hypotheses being positively entailed by the one or more conversation data sets of the plurality of conversation data sets, wherein each additional intent is based at least in part on a respective additional probability of the plurality of additional probabilities satisfying the threshold; and storing the plurality of additional intents at the database of the computing system.

3. The method of claim 1, further comprising:

modifying the threshold to a revised threshold based at least in part on storing the plurality of intents;

generating, using the natural language inference model, a plurality of additional probabilities for the respective data pairs that comprise the hypothesis from the plurality of hypotheses and a respective conversation data set from the plurality of conversation data sets, each additional probability corresponding to a determination of whether the respective hypothesis of the plurality of hypotheses is positively entailed by the respective conversation data set of the plurality of conversation data sets;

generating a plurality of additional intents based at least in part on generating the plurality of additional probabilities, each additional intent of the plurality of additional intents being based at least in part on the respective hypothesis of the plurality of hypotheses being positively entailed by the one or more conversation data sets of the plurality of conversation data sets, wherein each additional intent is based at least in part on a respective additional probability of the plurality of additional probabilities satisfying the revised threshold; and storing the plurality of additional intents at the database of the computing system.

4. The method of claim 1, wherein a conversation data set of the plurality of conversation data sets comprises text associated with an interaction between the representative of the organization and the user.

5. The method of claim 4, wherein the representative of the organization comprises an automated conversational application or a human agent.

6. The method of claim 1, wherein each hypothesis of the plurality of hypotheses comprises text corresponding to one or more conversation trends between one or more representatives of the organization and one or more users.

7. The method of claim 6, wherein the one or more conversation trends comprise an account payment, an account balance, a loan, a vehicle title, or any combination thereof.

8. The method of claim 1, wherein each hypothesis of the plurality of hypotheses is based at least in part on domain knowledge associated with the plurality of conversation data sets.

9. The method of claim 1, further comprising:

displaying the plurality of intents using a graphical user interface (GUI) associated with the computing system.

10. A non-transitory computer-readable medium storing code, the code comprising instructions executable by one or more processors to:

receive, at a computing system associated with an organization, a plurality of conversation data sets, each conversation data set being associated with a respective conversation between a representative of the organization and a user;

receive, at the computing system and from a domain knowledge database, a plurality of hypotheses associated with the plurality of conversation data sets, wherein each hypothesis of the plurality of hypotheses is based at least in part on domain-specific information applicable to an industry or activity, or both;

generate, using a natural language inference model, a plurality of probabilities for respective data pairs that each comprise a hypothesis from the plurality of hypotheses and a conversation data set from the plurality of conversation data sets, each probability corresponding to a determination of whether a respective hypothesis of the plurality of hypotheses is positively entailed by a respective conversation data set of the plurality of conversation data sets, wherein the natural language inference model comprises one or more bidirectional encoders and one or more autoregressive decoders;

generate, using neuro-symbolic techniques and incorporation of the domain-specific information, a plurality of intents based at least in part on the plurality of probabilities, each intent of the plurality of intents being based at least in part on one or more hypotheses of the plurality of hypotheses being positively entailed by one or more conversation data sets of the plurality of conversation data sets, wherein each intent is based at least in part on a respective probability of the plurality of probabilities satisfying a threshold, wherein the neuro-symbolic techniques comprise one or more neural architectures for language processing and one or more symbolic architectures for classifying respective intents; and store the plurality of intents at a database of the computing system.

11. The non-transitory computer-readable medium of claim 10, wherein the instructions are further executable by the one or more processors to:

identify a plurality of additional hypotheses based at least in part on the plurality of intents;

generate, using the natural language inference model, a plurality of additional probabilities for respective additional data pairs that comprise an additional hypothesis from the plurality of additional hypotheses and a respective conversation data set from the plurality of conversation data sets, each additional probability corresponding to a determination of whether a respective additional hypothesis of the plurality of additional hypotheses is positively entailed by the respective conversation data set of the plurality of conversation data sets;

generate a plurality of additional intents based at least in part on the plurality of additional probabilities, each additional intent of the plurality of additional intents being based at least in part on one or more additional hypotheses of the plurality of additional hypotheses being positively entailed by the one or more conversation data sets of the plurality of conversation data sets, wherein each additional intent is based at least in part on a respective additional probability of the plurality of additional probabilities satisfying the threshold; and store the plurality of additional intents at the database of the computing system.

12. The non-transitory computer-readable medium of claim 10, wherein the instructions are further executable by the one or more processors to:

modify the threshold to a revised threshold based at least in part on storing the plurality of intents;

generate, using the natural language inference model, a plurality of additional probabilities for the respective data pairs that comprise the hypothesis from the plurality of hypotheses and a respective conversation data set from the plurality of conversation data sets, each additional probability corresponding to a determination of whether the respective hypothesis of the plurality of hypotheses is positively entailed by the respective conversation data set of the plurality of conversation data sets;

generate a plurality of additional intents based at least in part on generating the plurality of additional probabilities, each additional intent of the plurality of additional intents being based at least in part on the respective hypothesis of the plurality of hypotheses being positively entailed by the one or more conversation data sets of the plurality of conversation data sets, wherein each additional intent is based at least in part on a respective additional probability of the plurality of additional probabilities satisfying the revised threshold; and store the plurality of additional intents at the database of the computing system.

13. The non-transitory computer-readable medium of claim 10, wherein a conversation data set of the plurality of conversation data sets comprises text associated with an interaction between the representative of the organization and the user.

14. The non-transitory computer-readable medium of claim 13, wherein the representative of the organization comprises an automated conversational application or a human agent.

15. The non-transitory computer-readable medium of claim 10, wherein each hypothesis of the plurality of hypotheses comprises text corresponding to one or more conversation trends between one or more representatives of the organization and one or more users.

16. The non-transitory computer-readable medium of claim 15, wherein the one or more conversation trends comprise an account payment, an account balance, a loan, a vehicle title, or any combination thereof.

17. The non-transitory computer-readable medium of claim 10, wherein each hypothesis of the plurality of hypotheses is based at least in part on domain knowledge associated with the plurality of conversation data sets.

18. An apparatus, comprising:

one or more processors;

one or more memories coupled with the one or more processors; and instructions stored in the one or more memories and executable by the one or more processors to cause the apparatus to:

receive, at a computing system associated with an organization, a plurality of conversation data sets, each conversation data set being associated with a respective conversation between a representative of the organization and a user;

receive, at the computing system and from a domain knowledge database, a plurality of hypotheses associated with the plurality of conversation data sets, wherein each hypothesis of the plurality of hypotheses is based at least in part on domain-specific information applicable to an industry or activity, or both;

generate, using a natural language inference model, a plurality of probabilities for respective data pairs that comprise a hypothesis from the plurality of hypotheses and a conversation data set from the plurality of conversation data sets, each probability corresponding to a determination of whether a respective hypothesis of the plurality of hypotheses is positively entailed by a respective conversation data set of the plurality of conversation data sets, wherein the natural language inference model comprises one or more bidirectional encoders and one or more autoregressive decoders;

generate, using neuro-symbolic techniques and incorporation of the domain-specific information, a plurality of intents based at least in part on the plurality of probabilities, each intent of the plurality of intents being based at least in part on one or more hypotheses of the plurality of hypotheses being positively entailed by one or more conversation data sets of the plurality of conversation data sets, wherein each intent is based at least in part on a respective probability of the plurality of probabilities satisfying a threshold, wherein the neuro-symbolic techniques comprise one or more neural architectures for language processing and one or more symbolic architectures for classifying respective intents; and store the plurality of intents at a database of the computing system.

\* \* \* \* \*